United States Patent Office 2,869,076
Patented Jan. 13, 1959

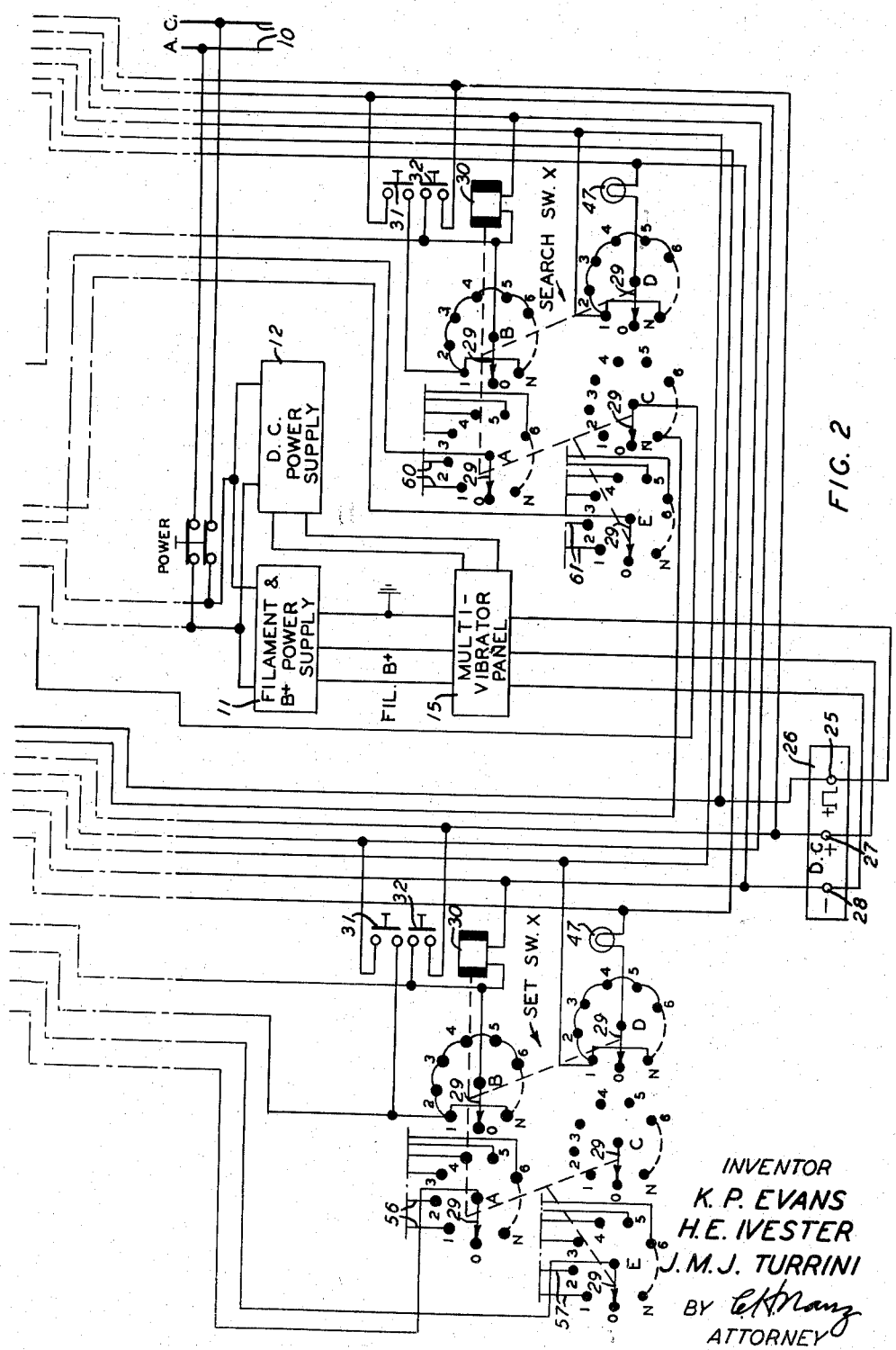

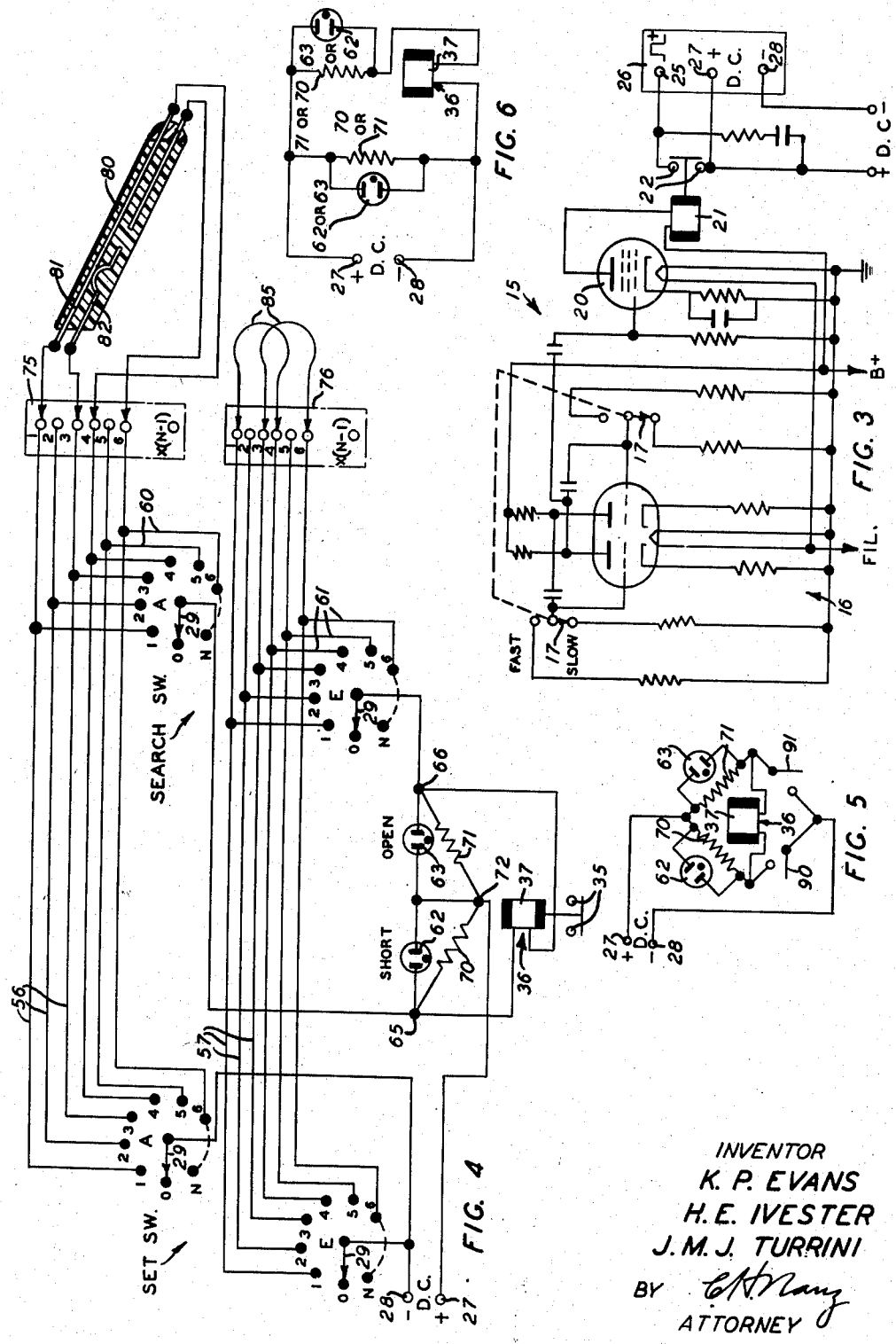

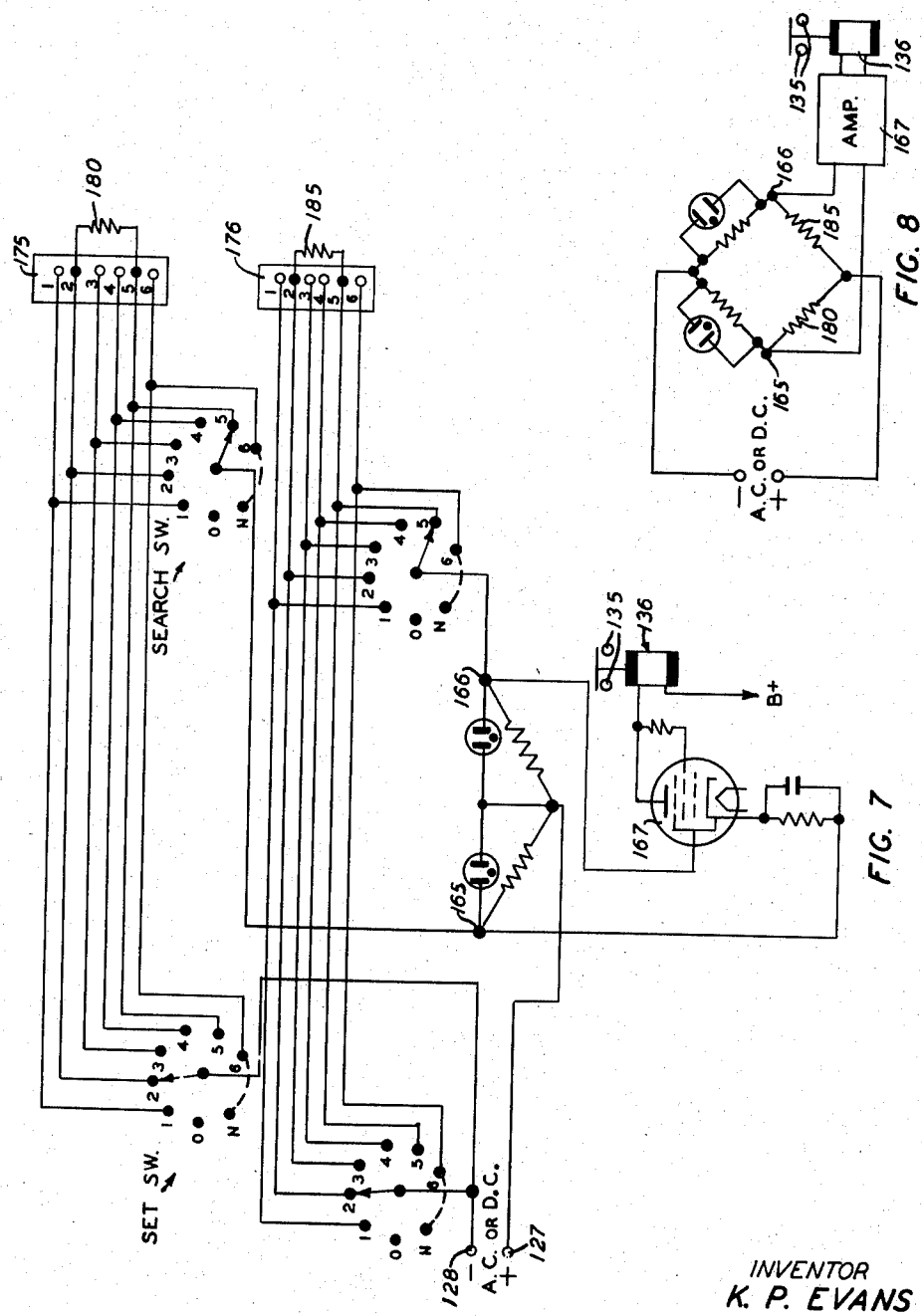

2,869,076

APPARATUS FOR TESTING A PLURALITY OF CIRCUITS

Kenneth P. Evans, Glen Burnie, Md., and Henry E. Ivester and John M. J. Turrini, Winston-Salem, N. C., assignors to Western Electric Company, Incorporated, New York, N. Y., a corporation of New York Application August 22, 1955, Serial No. 529,626

4 Claims. (Cl. 324—51)

This invention relates to apparatus for testing a plurality of circuits, and more particularly to apparatus for testing a plurality of circuits for any faults in and between such circuits.

In the manufacture of certain electrical equipment, such as junction boxes having a plurality of individual or interconnected circuits therein, multiconductor cables, or the like, it is necessary to test the circuits or conductors to determine that the wiring and other factors are correct and that there are no shorted or open conductors, crosses between conductors or conductors that are grounded. A common method of testing such devices is to place a continuity indicator successively on one end point of each circuit or conductor, and to place the other end of the indicator on the remaining end points of the circuits or conductors. In cases where large numbers of circuits or conductors are involved, this method is tedious, time consuming and costly.

An object of this invention is to provide new and improved apparatus for testing a plurality of circuits.

Another object of this invention is to provide new and improved apparatus for testing a plurality of circuits for any faults in and between such circuits.

Apparatus for testing a plurality of circuits, each having a plurality of end points illustrating certain features of the invention, may include a plurality of circuits which simulate desired conditions of each of the circuits to be tested, means for comparing the circuits to be tested with the simulating circuits, means for connecting successively to the comparison means one end point of each of the circuits to be tested in series with the remaining end points thereof and means for connecting the simulating circuit of each circuit to be tested to the comparison means as each circuit to be tested is connected thereto.

More specifically apparatus for testing a plurality of circuits, each of which has a plurality of end points illustrating certain features of the invention, may include a plurality of step-by-step switches, each of which has a plurality of banks of contacts. The banks are so connected that an end point of each circuit to be tested and the remaining end points of the circuits to be tested are placed successively in one arm of a bridge. At the same time, circuits simulating the desired conditions of the circuits to be tested are placed successively in an opposing arm of the bridge. If no faults exist in the circuits to be tested, each end point thereof is tested against all of the remaining end points automatically. If a fault exists, the test is stopped at a point from which cause of the fault can be determined.

A complete understanding of the invention may be obtained from the following detailed description of apparatus forming specific embodiments thereof, when read in conjunction with the appended drawings, in which:

Figs. 1 and 2, when combined with Fig. 2 positioned below Fig. 1, show schematically an electrical circuit embodying a portion of the present invention;

Fig. 3 is a detailed schematic diagram of a portion of the circuit shown in Fig. 2;

Fig. 4 is a detailed schematic diagram of a portion of the circuit shown in Fig. 1 illustrating its use in the testing of a particular product;

Figs. 5 and 6 are schematic circuit diagrams showing circuits equivalent to portions of the circuits shown in Figs. 1 and 4 illustrating their use in making certain tests;

Fig. 7 is a schematic circuit diagram similar to Fig. 4 showing an alternative embodiment of the invention, and Fig. 8 is a schematic circuit diagram showing a circuit equivalent to a portion of the circuit shown in Fig. 7 illustrating its use in making certain tests.

Figure 1:
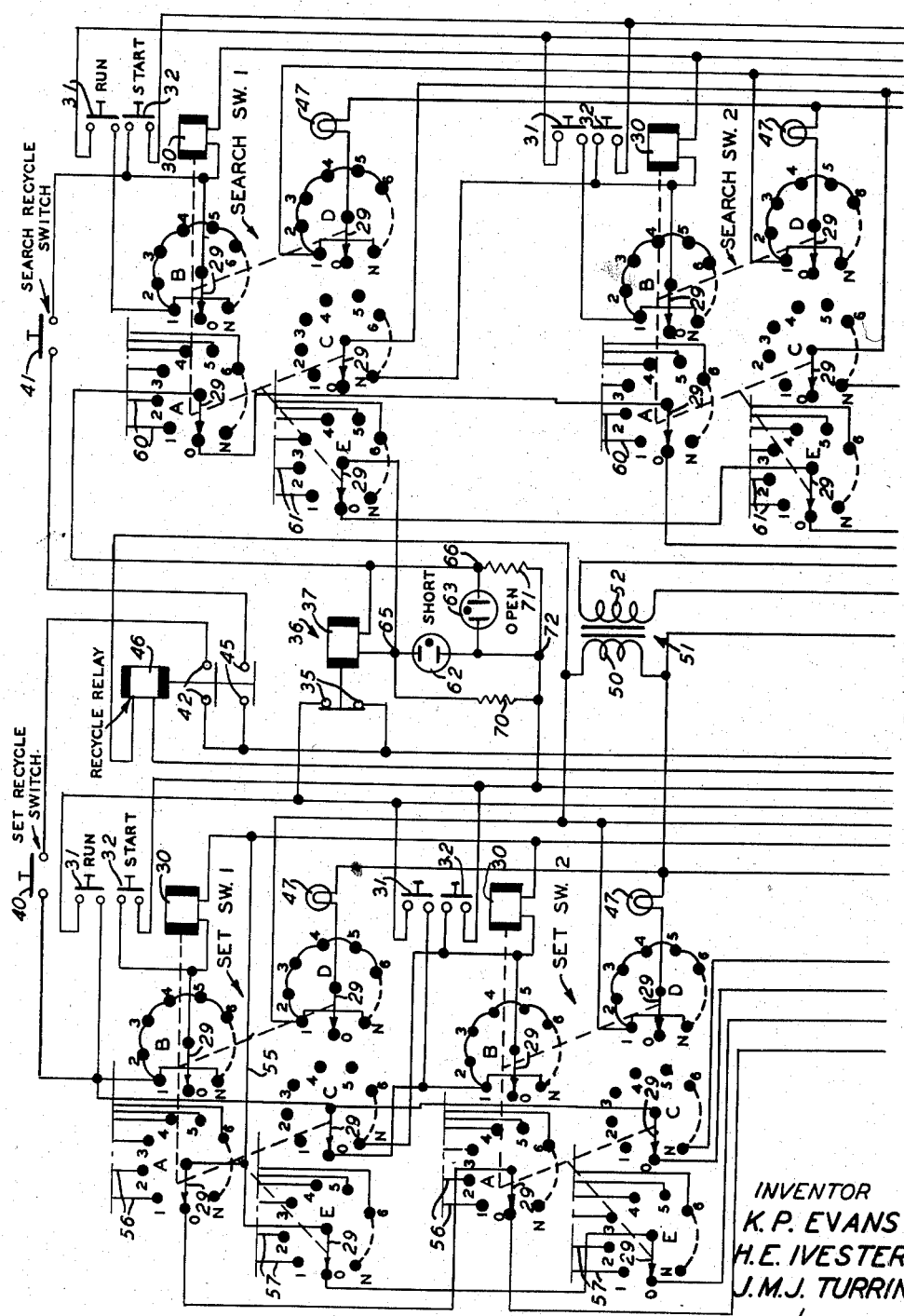

Referring to the drawings, wherein like reference characters designate identical parts throughout the several views, and more particularly to Figs. 1 and 2, a plurality of step-by-step switches are shown, each of which is desiganed either "Set Switch" or "Search Switch." The purpose of such designation is that, when a plurality of circuits or the like are to be tested, a contact on one of the set switches is connected to one end point of one of the circuits or the like, and the search switches "search" the remaining end points of the circuits to determine whether any fault exists in and between the circuits. If all of the circuits are satisfactory, the test continues until all have been tested. If, for example, a circuit is wired incorrectly, the search switch in operation at the time will stop at the incorrectly wired circuit, which can be easily located and repaired. The step-by-step switches are further designated 1, 2, . . . X, with phantom lines connected between the "2" switches and the "X" switches, illustrating that any desired number thereof may be utilized.

Referring to Fig. 2, power is applied to the various step-by-step switches from an A. C. supply line across coductors 10—10. The A. C. voltage is applied to power supplies 11 and 12. The power supply 11 is of a standard type, which supplies a suitable filament voltage and a high voltage designated as "B+." The power supply 12 merely rectifies the A. C. voltage input thereto to provide a continuous D. C. voltage.

The outputs of the power supplies 11 and 12 are connected to a multivibrator panel 15 which is shown in detail in Fig. 3. Referring to Fig. 3, there is shown a standard multivibrator circuit 16 except that means are provided for varying the repetition rate of the output pulses thereof. To this end, two ganged switches 17—17 are provided which can be placed in either of two positions, designated "Fast" and "Slow." By placing the switches 17—17 in either of the two positions, different resistors are placed in the multivibrator circuit to vary the output frequency. Such multivibrators are well known in the art and need not be described more fully here.

The output of the multivibrator 16 is coupled to the input of a pentode vacuum tube 20, which is connected as an amplifier. A relay 21 is placed in the plate circuit of the tube 20, and pulses will be applied thereacross at intervals determined by the multivibrator 16. A pair of contacts 22—22 associated with the relay coil 21 will, therefore, be opened and closed at intervals determined by the repetition rate of the multivibrator 16. The positive (+) side of the continuous D. C. voltage from the power supply 12 is connected in series with the contacts 22—22. Therefore, the continuous D. C. voltage will be interrupted periodically to produce a positive, pulsating D. C. voltage, which is connected to a terminal 25 on a terminal board 26. A second terminal 27 on the board 26 is connected directly to the positive side of the continuous D. C. voltage to supply such a voltage to this point. The negative (−) side of the continuous D. C.

potential, which is also the negative side of the pulsating D. C. potenital on the terminal 25, is connected to a terminal 28 on the board 26. The terminal board 26 with the terminals 25, 27 and 28 thereon is shown also at the bottom of Fig. 2.

The various step-by-step switches shown in Figs. 1 and 2 are substantially identical, and a description of Set Switch 1 will suffice for all. Set Switch 1 (Fig. 1) includes five similar banks of contacts designated "A" to "E," inclusive. Each of the five banks has an equal number of contacts spaced therearound, which are designated "0, 1, 2, 3, ... N." Each of the five banks further has a rotating, conductive brush 29, which engages successively the contacts 0 to N, inclusive. The five brushes 29—29 associated with the A to E banks of Set Switch 1 are connected mechanically to each other so that the brushes 29—29 contact similarly-numbered contacts on the five banks at all times.

The five brushes 29—29 associated with each step-by-step switch are advanced by a stepping magnet 30. When the magnet 30 is energized by a D. C. voltage, a spring (not shown) in the step-by-step switch is compressed, and de-energization of the magnet 30 causes the spring to release and advance the brushes one step, i. e. to the next succeeding contact 1 to N, inclusive. The stepping magnet 30 may be energized in various manners, as will be now described with reference to Set Switch 1.

Associated with Set Switch 1 are two switches 31 and 32, which are designated "Run" and "Start," respectively. When the Start Switch 32 is closed, the continuous D. C. voltage from the terminal 27 is applied to the stepping magnet 30 associated with Set Switch 1. In this case, a continuous direct current flows from the terminal 27 through the contacts of the Start Switch 32, through the stepping magnet 30 and to the negative side of the D. C. potential at the terminal 28. Therefore, when the Start Switch 32 is opened, the stepping magnet 30 will be de-energized and the five brushes 29—29 associated with the A to E banks, inclusive, will advance one step. In order to advance the brushes 29—29 one more step around the banks by using the Start Switch 32, the Start Switch must be reclosed and reopened.

All of the contacts on the B banks of the step-by-step switches are connected together electrically with the exception of the 0 contact. When the brush 29 associated with the B bank is on any position other than 0 and the Run Switch 31 is closed, the pulsating D. C. potential from the terminal 25 is applied across the stepping magnet 30. In this case, a pulsating direct current flows from the terminal 25 through the contacts 35—35 of a normally-closed relay 36 having a coil 37, through the contacts of the Run Switch 31, through the brush 29 associated with the B bank (not on 0), through the stepping magnet 30 and back to the negative terminal 28. Under this condition, Set Switch 1 is advanced one step each time a pulse is applied to the terminal 25 from the multivibrator panel 15. This occurs since the D. C. voltage that is applied across the stepping magnet 30 when the contacts 22—22 of the relay 21 in the multivibrator panel are closed compresses the spring in the step-by-step switch. When the contacts 22—22 open, the spring is released and the brushes 29—29 of the step-by-step switch advance one step.

Power can be applied to the stepping magnet 30 through still another path. Two switches 40 and 41 (Fig. 1), which are designated "Set Recycle Switch" and "Search Recycle Switch," respectively, are provided. Their purpose will be described more fully hereinafter, but for the present, assume that the switches 40 and 41 are closed, and that the brushes 29—29 associated with the various banks of Set Switch 1 are on a position other than 0. If contacts 42—42 and 45—45 of a Recycle Relay 46 are closed, a pulsating direct current will flow from the terminal 25 through the contacts 42—42 of the relay 46, through the Set Recycle Switch 40, the brush 29 in the B bank of Set Switch 1, the stepping magnet 30 and to the negative terminal 28. At the same time a pulsating direct current will flow through the contacts 45—45 of the relay 46 and the switch 41 to the stepping magnet 30 of Search Switch 1.

The function of the C bank of each step-by-step switch is to energize the next step-by-step switch after the brushes 29—29 on a given switch have passed through the N positions. For example, assume that the contacts of the Recycle Relay 46 are closed, the contacts of the Set Recycle Switch 40 are closed and that the five brushes 29—29 of Set Switch 1 are on position N. A pulsating D. C. current will then flow through the stepping magnet 30 of Set Switch 2 from the terminal 25, through the contacts 42—42 of the Recycle Relay 46, the contacts of the Set Recycle Switch 40, the brush 29 on the C bank of Set Switch 1, the contact N thereof, the stepping magnet 30 of Set Switch 2 and back to the negative terminal 28.

The D bank of each step-by-step switch indicates when the brushes 29—29 of a particular switch are on a position other than 0. All of the contacts of the D bank are connected together electrically with the exception of the 0 contact. If the brushes 29—29 of any of the D banks are not on contact 0, a lamp 47 associated therewith is placed across the secondary 50 of a transformer 51. The primary 52 of the transformer is connected directly to the A. C. power lines 10—10.

Thus far, the B, C and D banks of the step-by-step switches have been described. The B and C banks determine the order in which the various step-by-step switches operate, while the D banks indicate which switches are operating at any given time. The A and E banks, which are the banks used to test a plurality of circuits or conductors, will now be described.

Referring to Figs. 1 and 2, the brushes 29—29 associated with the A and the E banks of Set Switch 1 are connected together and to the negative D. C. voltage on the terminal 28 through a conductor 55. The 0 contacts of the A and E banks of Set Switch 1 are connected to the brushes 29—29 of the A and E banks, respectively, of Set Switch 2. Therefore, when the brushes of Set Switch 2 are advancing through their various steps, they will be connected electrically to the negative D. C. voltage on the terminal 28 through the conductor 55, since the brushes 29—29 of Set Switch 1 will be on 0 at this time. The same condition exists for succeeding switches in the series, that is, no matter which Set Switch 1 to X, inclusive, is being advanced through its various steps, the brushes of the A and E banks of that switch are connected to the negative D. C. voltage at the terminal 28.

A plurality of conductors 56—56 are connected to all of the contacts on the A bank of Set Switch 1 except contacts 0 and N. Conductors 56—56 are likewise connected to the contacts on the A banks of the remaining Set Switches. A plurality of conductors 57—57 are connected to the contacts of the E banks of the Set Switches except contacts 0 and N. Referring to the Search Switches in Figs. 1 and 2, conductors 60—60 and 61—61 are connected to the A and E banks thereof, respectively, in the same manner that the conductors 56—56 and 57—57 are connected to the A and E banks of the Set Switches.

The brush 29 associated with the A bank of, for example, Search Switch 1 is connected to one side of the coil 37 of the relay 36 and the brush 29 associated with the E bank is connected to the other side thereof. The contacts 35—35 of the relay 36 are normally closed, and will open only when a fault is found in a circuit being tested. Since the contacts 35—35 of the relay 36 are in series with the stepping magnets 30—30 of the various step-by-step switches and the pulsating D. C. voltage at the terminal 25 which causes the stepping action of the switches, the step-by-step switch that is operating during a test of a faulty circuit will stop when such fault occurs.

The coil 37 of the relay 36 is connected across two series-connected, gas-filled discharge tubes 62 and 63 at junctions 65 and 66. Resistors 70 and 71 of equal resistance are connected in parallel with the discharge tubes 62 and 63, respectively, and a common junction 72 of the discharge tubes 62 and 63 and the resistors 70 and 71 is connected to the positive side of the continuous D. C. voltage on terminal 27.

Referring to Fig. 4, the A and E banks of similarly numbered Set Switches and Search Switches are shown. Fig. 4, therefore, depicts any of the A and E banks from Set Switch 1 and Search Switch 1 to Set Switch X and Search Switch X, inclusive. The conductors 56—56 from the contacts of the A bank of the Set Switch are connected to a terminal board 75. The conductors 60—60 from the contacts of the A bank of the Search Switch are so connected to the conductors 56—56 that similarly numbered contacts of the A banks of the Set Switches and Search Switches are connected directly together and to similarly numbered terminals on the terminal board 75. Similar connections are made between the contacts of the E banks by connecting the conductors 57—57 to a terminal board 76 and the conductors 61—61 to the conductors 57—57.

As described hereinbefore, after the brushes 29—29 of Set Switch 1 pass through all of the positions on the various banks A to E, inclusive, Set Switch 2 is energized automatically. The brushes 29—29 associated with Set Switch 2 will pass eventually through all of the positions on the various banks associated therewith, and each Set Switch thereafter will be energized successively until the brushes 29—29 of the last one, Set Switch X in Fig. 2, pass through all of their positions. The effect of this operation is to place all of the contacts, except the 0 and N contacts, on the A banks of all of the Set Switches in a series.

Since there are no conductors 56—56 connected to contacts 0 and N on the A bank of the Set Switch in Fig. 4, $(N-1)$ contacts of each Set Switch are connected to the terminal board 75. X number of Set Switches are illustrated in Figs. 1 and 2, so that the terminal board 75 will have a total of X $(N-1)$ connections made thereto from the A banks of the Set Switches. In Fig. 4, a cable 80 having two conductors 81 and 82 therein is shown, for illustrative purposes, undergoing a test. Both end points of the conductors 80 and 81 are connected to the terminal board 75. Therefore, with the present invention X $(N-1)/2$ circuits or X $(N-1)$ end points of the circuits can be tested successively. This is so when a product like the cable 80 is to be tested, that is, one where there are two end points for each circuit. In some products, such as complex junction boxes, circuits may be interconnected internally and the number of end points may not equal twice the number of circuits.

The E banks of cooperating Set Switches and Search Switches are connected like the A banks thereof to the terminal board 76. A plurality of jumper wires 85—85 are connected to the terminal 76 at similarly-numbered terminals as the circuits to be tested are connected to the terminal board 75. The presence or absence of the jumper wires 85—85 simulate the desired conditions of the circuits to be tested. As in the case of the terminal board 75, a total of $X(N-1)$ terminals is provided on the board 76. Also, as will be discussed more fully hereinafter, as each Set Switch advances through a single step, each Search Switch proceeds through N steps so that each end point of each circuit to be tested is tested against every other end point of the circuits undergoing the test.

OPERATION

To illustrate the testing of a particular product for continuity, shorts, opens, etc., the operation of the apparatus on the cable 80 (Fig. 4) will be described. It will be assumed that the conductor 81 therein is continuous, that the conductor 82 is open and also shorted to the conductor 81 within the cable 80, as shown in Fig. 4.

The ends of the conductor 81 are connected to the terminals 1 and 4 of the terminal board 75. They may, of course, be connected to any other pair of terminals. A jumper wire 85 is connected between the terminals 1 and 4 of the terminal board 76 to simulate the conductor 81. The ends of the conductor 82 are connected across the terminals 3 and 6 of the terminal board 75, and the operator, not knowing that the conductor 82 is open within the cable 80 at this time, connects a jumper wire 85 between the terminals 3 and 6 of the board 76 to simulate the desired condition of the conductor 82.

At the beginning of the test, all switches are open and the contacts of all the relays, except the contacts 35—35 of the relay 36 (Figs. 1 and 4) are open. The operator closes momentarily the Start Switch 32 associated with Set Switch 1. Upon release of the Start Switch 32, the continuous D. C. voltage on the terminal 27 causes the brushes 29—29 of Set Switch 1 to advance one step so that the brushes connect to contact 1 of each bank A to E, inclusive, as described hereinbefore.

The Run Switches 31—31 associated with all of the Search Switches are then closed, and the Recycle Switches 40 and 41 are closed. The operator then closes momentarily the Start Switch 32 associated with Search Switch 1. As described hereinbefore, the stepping magnet 30 associated with Search Switch 1 is energized by the continuous D. C. voltage at the terminal 27, and the opening of the Start Switch 32 causes the brushes 29—29 of the Search Switch 1 to advance to contact 1 on each bank A to E, inclusive.

If the product being tested were perfect, the testing apparatus would test automatically each end point of the product against every other end point and stop only at the completion of such tests. Since the Run Switches 31—31 associated with the Set Switches are open and those associated with the Search Switches are closed and since only the brushes 29—29 of Search Switch 1 are on a position other than 0, the pulsating D. C. voltage at the terminal 25 will be applied through the closed contacts 35—35 of the relay 36 to the stepping magnet 30 associated with Search Switch 1. Therefore, the pulsating D. C. voltage from the terminal 25 will cause the brushes of Search Switch 1 to advance, step-by-step, from position 1, through position N and back to the 0 position. As mentioned above, the stepping magnets of Search Switch 2 to Search Switch X, inclusive, will not be affected until Search Switch 1 reaches position N, since the brushes thereof are on the 0 position and there is no complete circuit to the stepping magnets associated therewith.

When the brushes 29—29 of Search Switch 1 advance to position N, the pulsating D. C. voltage at the terminal 25 is applied to the stepping magnet of Search Switch 2 to advance the brushes of Search Switch 2 to position 1. In this case, the pulsating D. C. voltage is applied directly through the brush 29 and contact N of the C bank of Search Switch 1 and not through the contacts 35—35 of the relay 36. When the brushes 29—29 of Search Switch 2 advance to position 1, the brushes of Search Switch 1 advance from the N position to the 0 position. Therefore, the pulsating D. C. voltage at the terminal 25 is applied through the contacts 35—35 of the relay 36 to the stepping magnet 30 of Search Switch 2 only.

The same operation of the Search Switches continues until the brushes of Search Switch X reach position N. Up to this time the circuit end point connected to terminal 1 of the board 75, and hence to contact 1 on the A bank of Set Switch 1, has been tested against the end points of all of the circuits connected to the board 75.

The next operation of the apparatus is to test the circuit end point connected to terminal 2 of the board 75 against the ends of all of such circuits. This is accomplished by advancing the brushes 29—29 of Set Switch 1 to position 2, as will now be described. When the brushes of Search Switch X reach position N, a circuit is completed from the upper end of the secondary 50 of the transformer 51 through the coil of the Recycle Relay 46, through contact N on the C bank of Search Switch X, the brush 29 thereof and back to the lower end of the secondary 50. This causes the relay 46 to energize and close the contacts 42—42 and 45—45. As hereinbefore described, the pulsating D. C. current from terminal 25 is applied through the contacts 42—42, the Set Recycle Switch 40, contact 1 on the B bank of Set Switch 1, the brush 29 thereof and the stepping magnet 30 of Set Switch 1. This will cause the brushes of Set Switch 1 to advance to contact 2. Since the brushes 29—29 of Search Switch X advance from position N to position 0, the circuit between the coil of the Recycle Relay 46 and the secondary 50 of the transformer 51 is opened so that the contacts 42—42 and 45—45 are opened.

When the contacts 45—45 were closed by the energizing of the Recycle Relay 46, a circuit was also completed from the pulsating D. C. voltage at the terminal 25 through the contacts 45—45 and the Search Recycle switch 41 to the stepping magnet 30 of Search Switch 1. Therefore, the brushes of the Search Switches 1 to X, inclusive, pass through the contacts on the banks thereof successively while the brushes of the Set Switch 1 remain on position 2. The same operation continues until each position on the Set Switches has been checked against every position of the Search Switches. Hence, each end point of the circuits to be tested is checked against every other end point of such circuits.

The discussion hereinabove assumes that a large number of circuits are to be tested so that the step-by-step switches are allowed to pass automatically through all of their positions. The test on cable 80 is, by comparison, a relatively simple procedure, but it will serve to illustrate the operation of the A and E banks of the step-by-step switches.

Referring again to Fig. 4, assume that the conductors 81 and 82 to be tested and the jumpers 85—85, which simulate these conductors, are connected to the terminal boards 75 and 76, as shown and described hereinbefore. Assume further that the brushes of the A and E banks on the Set Switch shown in Fig. 4 have advanced to position 1 by closing and opening manually the Start Switch 31 associated therewith. The brushes of the A and E banks of the Search Switch shown in Fig. 4 are advanced to position 1 thereof by closing and opening manually the Start Switch 32 associated therewith. After this, the brushes 29—29 of the Search Switch will pass automatically through all of their positions. Following this operation, the brushes 29—29 of the A and E banks of the Set Switch will advance to position 2, and the brushes 29—29 of the A and E banks of the Search Switch will again pass through all of their positions around the banks. This same operation continues until each position of the Set Switch has been checked against all positions of the Search Switch.

In Fig. 4, assume that the brushes 29—29 of the A banks and E banks of both the Set Switch and the Search Switch are on position 1. A circuit is completed from the negative terminal 28 through the brush 29 on the A bank of the Set Switch, contact 1 thereof, the conductor 56, the conductor 60, contact 1 on the A bank of the Search Switch, the brush 29 thereof, and to the junction 65, which is connected to one side of the coil 37 of the relay 36. A similar circuit is completed from the negative terminal 28 through the brush 29 on the E bank of the Set Switch, contact 1 thereof, the conductor 57, the conductor 61, contact 1 on the E bank of the Search Switch, the brush 29 thereof and to the junction 66, which is connected to the opposite end of the coil 37 of the relay 36. Since the current from the junctions 65 and 66 takes similar paths through resistors 70 and 71 of equal value, through the junction 72 and back to the positive terminal 27, equal voltages are applied to both sides of the coil 37 of the relay 36. Therefore, the contacts 35—35 of the relay 36 will remain closed and the brushes 29—29 of the Search Switch will advance to position 2, since the path to the stepping magnet 30 thereof has not been interrupted. It can be seen that internal connections of the apparatus of the present invention prevent the Search Switches from stopping when the brushes of the Set Switches and Search Switches contact the same circuit end point. In this case the end point involved is the one connected to terminal 1 of the board 75.

While the brushes 29—29 of the A and E banks of the Search Switch are on position 1, a circuit equivalent to that shown in Fig. 5 is established. Switches 90 and 91 of the equivalent circuit shown in Fig. 5 are closed under these conditions, since these switches represent the parallel connections between identical banks of the Set Switch and Search Switch in this example. When the brushes of the A and E banks of the Search Switch advance to position 2, those of the Set Switch remain on position 1, as described hereinbefore. In this case, the paths to the junctions 65 and 66 across the coil 37 of the relay 36 are open, and a circuit as shown in Fig. 5 with the switches 90 and 91 open is established. In this latter case, zero potential appears at both the junctions 65 and 66 and again the coil 37 of the relay 36 is not energized. Therefore, the brushes 29—29 of the A and E banks of the Search Switch are advanced automatically to position 3.

As hereinbefore described, the conductors 81 and 82 of the cable 80 are in fact shorted internally of the cable. This short will appear between terminals 1 and 3 of the board 75. Since this condition should not exist, no jumper wire 85 was placed between terminals 1 and 3 of the board 76. Because of the short between the conductors 81 and 82 when the brushes of the Search Switch advance to position 3, a circuit is completed from the negative terminal 28 through the brush 29 on the A bank of the Set Switch, contact 1 thereof, the conductor 56, terminal 1 on the board 75, the conductor 81, the short between the conductors 81 and 82, the conductor 82, terminal 3 of the board 75, the conductor 60, contact 3 on the A bank of the Search Switch and the brush 29 thereof to junction 65. Since there is no jumper wire between terminals 1 and 3 of the board 76, no circuit is completed from the negative terminal 28 through the E banks of the Set and Search Switches to the junction 66. Therefore, a D. C. voltage is applied across the coil 37 of relay 36, and the contacts 35—35 thereof are opened. The pulsating D. C. that was being applied to the stepping magnet of the Search Switch from the terminal 25 is then opened and the brushes 29—29 of the Search Switch will stop on position 3.

When the Search Switch stops on position 3, a circuit equivalent to that shown in Fig. 6 is set up. If the resistance of the coil 37 of the relay 36 is equal to that of each of the resistors 70 and 71, the full D. C. voltage from the terminals 27 and 28 (Fig. 4) will be applied across the resistor 70 and one-half of the D. C. voltage across the resistor 71 and the coil 37 of the relay 36, since the latter two are in series at this time. Assuming further that the gas discharge tubes 62 and 63 must have approximately the full D. C. voltage applied thereacross in order to conduct, only the tube 62 will conduct when the brushes 29—29 of the Search Switch are on position 3. Since such conditions were imposed because of the short between the conductors 81 and 82, the gas discharge tube 62 will indicate this condition and is designated "Short" in Figs. 1 and 4 of the drawings.

As discussed hereinbefore, the short between the conductors 81 and 82 will cause the contacts 35—35 of the relay 36 to open. This will open the circuit of the pulsating D. C. voltage from the terminal 25 to the stepping magnet 30 of the Search Switch, and the brushes on the A and E banks of the Search Switch will stop on position 3. The operator will know immediately that a short exists between conductors 81 and 82, and, in the instant case, the cable 80 will not be tested further and will be rejected or repaired. If the product under test is a junction box or the like, such a short may be located and repaired.

In order to explain further the operation of the apparatus embodying the invention assume that the test on the cable 80 is continued. To so continue the test, the operator must close the Start Switch 32 associated with the Search Switch. As discussed hereinbefore, the continuous D. C. voltage at the terminal 27 will be applied directly to the stepping magnet 30 of the Search Switch and the contacts 35—35 of the relay 36 will be by-passed. The brushes of the A and E banks of the Search Switch will, therefore, advance to position 4.

Since the conductor 81 is connected between terminals 1 and 4 of the board 75, a jumper wire 85 was placed between terminals 1 and 4 of the board 76. A circuit is completed from the negative terminal 28 through the conductor 81 to the junction 65. A similar circuit is completed from the negative terminal 28 through the jumper wire 85 between terminals 1 and 4 of the board 76 to the junction 66. Again a circuit similar to Fig. 5 with the switches 90 and 91 closed is established, and the coil 37 of the relay 36 will no longer be energized. In this case, the switches 90 and 91 represent the continuous conductor 81 and the jumper wire 85 between the terminals 1 and 4 of the board 76, respectively. Therefore, the brushes on the A and E banks of the Search Switch will advance to position 5.

Since no trouble exists between positions 1 and 5, no voltage will be applied to either side of the coil 37 of relay 36, and the brushes of the Search Switch will advance to position 6. If only a short circuit existed between the conductors 81 and 82, the coil 37 of the relay 36 would be energized when the brushes of the Search Switch were on position 6. However, since the conductor 82 is also open, no trouble will be indicated at this position.

The open circuit of the conductor 82 will be indicated when the brushes of the Set Switch have advanced to position 3 and the brushes of the Search Switch have advanced to position 6. Under these conditions, a circuit is completed from the negative terminal 28 through the brush 29 on the E bank of the Set Switch, contact 3 thereof, the conductor 57, terminal 3 of the board 76, the jumper wire 85, terminal 6 of the board 76, the conductor 61, contact 6 on the E bank of the Search Switch and the brush 29 thereof, to the junction 66.

Since the conductor 82 is open, the circuit through the A banks is open and no voltage will be applied to the junction 65. Therefore, the relay 36 will be energized and contacts 35—35 will be opened. Also, a circuit equivalent to that shown in Fig. 6 is established wherein the resistor 71 has the full D. C. voltage applied thereacross and the resistor 70, now in series with the coil 37 of the relay 36, has only one-half of the D. C. voltage applied thereacross. The gas discharge tube 63 will, therefore, conduct to indicate the open condition of the conductor 82, and this condition is designated "Open" in Fig. 4 of the drawings.

It will be noted that short circuits between the conductors 81 and 82 will also be detected when the Search Switch of Fig. 4 is on position 3 and the Set Switch on position 1. Electrically, the same circuit will exist as existed when the Set Switch was on position 1 and the Search Switch on position 3. The circuits are similar in that the D. C. voltage will be applied to the junction 65 due to the short between the conductors 81 and 82 but not to the junction 66, since no jumper wire 85 is connected between terminals 3 and 1 of the board 76.

It can be seen, therefore, that the test set embodying the present invention will double check each circuit under test. The advantages of this important feature are not so obvious when a cable, such as the cable 80, having relatively simple circuits or conductors is being tested. When such a defective cable as the cable 80 is found it may be rejected, or sections thereof may be repaired or salvaged. However, when a complicated junction box or switching device is being tested, as faults are found they are corrected. Then, when the testing apparatus checks for the second time the circuit that was at fault, the operator will be assured that the fault was fixed correctly.

The purpose of the "Fast-Slow" switches 17—17 shown in Fig. 3 is merely to permit the operator to check a circuit slowly when a fault is found. As will be described more fully hereinafter, the switches 17—17 are placed on the "Fast" position while the testing apparatus is automatically testing one end point against all others. When a particular Search Switch stops due to a faulty circuit, the operator can go over the test again with the switches 17—17 on the "Slow" position to make certain whether a true fault exists.

In a practical embodiment of the present invention, 6 set switches and 6 search switches were constructed according thereto. Each step-by-step switch had 52 contacts (0 to N) on each of the five banks A to E, inclusive. Therefore, 50 of such contacts on each step-by-step switch were used to test circuits since the contacts 0 and N of the A and E banks are not used for the testing. Since there were 6 of such switches, a maximum of 300 end points could be tested in succession.

In actual products tested by the present invention, 240 end points were to be tested. Of these, from 5 to 13 were to be continuous and the remaining ones were to present an open circuit between the end points. In lieu of the jumper wires shown in Fig. 4 to simulate these closed circuits, a suitable arrangement was used wherein conductors similar to the jumper wires 85—85 were selectively connected to terminals, and the terminals were matched with the terminals on the board 76 so that simulating circuits for the products to be tested could be easily obtained at the board 76.

Under these conditions if all circuits in the product to be tested were correctly wired and no trouble existed therein, the repetition rate of the multivibrator 16 was such on the "Fast" position of switches 17—17, that the search switches completed 240 steps in ¼ of a minute. Since the set switches passed through 240 positions also, the total time to test a product was 60 minutes. It will be remembered that each circuit in the product was double-checked so that a total of $(240)^2$ or 57,600 tests were made in this time.

Alternative embodiment

In Fig. 7 a modification of the apparatus hereinbefore described is shown. The circuits shown in Fig. 7 may be used to test a plurality of circuits containing resistors, inductors or capacitors in addition to merely shorts, crosses and the like. The differences between the circuit of Fig. 7 and those shown in Figs. 1 through 6, are that junctions 165 and 166 (similar to junctions 65 and 66) are connected to the input of an amplifier 167, and terminals 127 and 128 (similar to terminals 27 and 28) are energized by an A. C. voltage in the case of inductors and capacitors, and by either an A. C. or D. C. voltage in the case of resistors.

A relay 136 is placed in the plate circuit of the amplifier 167 and the function thereof is similar to that of the relay 36 shown in Fig. 1, that is, when contacts 135—135 thereof are opened, the circuits from a pulsating D. C. voltage to the stepping magnets of the various step-by-step switches are opened. When circuits containing resistors are to be tested and a D. C. voltage is applied to the terminals 127 and 128, the tube 167 must be a D. C. amplifier and the relay 136 must be a differential type relay.

Fig. 7 shows a simple illustration of the operation of the apparatus in testing a single resistor 180. The resistor 180 is connected between terminals 2 and 5 of a terminal board 175. A standard resistor 185, which represents the desired value of the resistor 180 under test, is connected between identical terminals on a terminal board 176, that is, between terminals 2 and 5 thereof. When the brushes of the Set Switch advance to position 2 and the brushes of the Search Switch advance to position 5, as shown in Fig. 7, a circuit equivalent to that shown in Fig. 8 is established.

If the resistor 180 under test is within predetermined values which are sufficiently close to the desired value of the standard resistor 185, there will be only a small unbalance of the bridge shown in Fig. 8. There will be, therefore, a small output voltage across the junctions 165 and 166. This output, even though amplified by the amplifier 167, is insufficient to energize the relay 136. However, if the resistor is not within the predetermined values, the relay 136 will be energized and the circuit to the stepping magnets of the step-by-step switches will be opened by opening the contacts 135—135.

As hereinbefore discussed, Figs. 7 and 8 illustrate simply how the testing apparatus of the invention may be used to test circuits containing resistors. It is obvious that when testing circuits containing resistors, inductors and capacitors are to be tested, the only requirement necessary is that circuits simulating the particular components to be tested be of the desired value or within predetermined limits. As discussed with reference to Figs. 1 through 6, a multiplicity of circuits can be tested with the apparatus embodying the invention for predetermined values of resistors, inductors and capacitors, shorts in the components, open circuits, crosses between circuits and grounded circuits.

What is claimed is:

1. Apparatus for testing a plurality of conductors of a multiple conductor network for electrical defects, which comprises a reference network including a plurality of conductors corresponding to the conductors of the network under test and presenting a perfect network with which the network under test is to be compared, a pair of set switches, a pair of search switches, each of said switches being of the stepping type including a plurality of individual contacts, a movable brush and stepping means operable to move the brush into successive positions so that the individual contacts are engaged successively by the brush, a first of said set switches being designed so that its brush electrically engages in a predetermined sequence each of the end points of the conductors under test and a first of said search switches being designed so that its brush electrically engages successively each of the end points of said last mentioned conductors at each position of the brush of said first set switch, the second set switch operating concurrently with said first set switch so that its brush electrically engages successively in said predetermined sequence each of the end points of the reference conductors corresponding to the conductors under test and the second search switch operating concurrently with said first search switch so that its brush electrically engages successively each of the corresponding end points of the reference conductors at each position of the brush of said second set switch, means for energizing the stepping means of said switches, an electrical balancing bridge having a first pair of balancing arms of fixed impedance and a second pair of balancing arms, the brushes of the switches being connected electrically to the bridge in a manner such that the electrical circuit at any time between the brushes of the first set switch and the first search switch is connected in one of the second pair of balancing arms and the electrical circuit at any time between the brushes of the second set switch and the second search switch is connected in the other of said second pair of balancing arms, bridge energizing means connected across one diagonal of the bridge, and detecting means connected across the other diagonal of the bridge for detecting an unbalanced condition caused by an electrical defect in the network under test.

2. Apparatus for testing a plurality of conductors of a multiple conductor network for electrical defects, which comprises a reference network including a plurality of conductors corresponding to the conductors of the network under test and presenting a perfect network with which the network under test is to be compared, a pair of set switches, a pair of search switches, each of said switches being of the stepping type including a plurality of individual contacts, a movable brush and stepping means operable to move the brush into successive positions so that the individual contacts are engaged successively by the brush, a first of said set switches being designed so that its brush electrically engages in a predetermined sequence each of the end points of the conductors under test and a first of said search switches being designed so that its brush electrically engages successively each of the end points of said last mentioned conductors at each position of the brush of said first set switch, the second set switch operating concurrently with said first set switch so that its brush electrically engages successively in said predetermined sequence each of the end points of the reference conductors corresponding to the conductors under test and the second search switch operating concurrently with said first search switch so that its brush electrically engages successively each of the corresponding end points of the reference conductors at each position of the brush of said second set switch, means for energizing the stepping means of said switches, an electrical balancing bridge having a first pair of balancing arms of fixed impedance and a second pair of balancing arms, the brushes of the switches being connected electrically to the bridge in a manner such that the electrical circuit at any time between the brushes of the first set switch and the first search switch is connected in one of the second pair of balancing arms and the electrical circuit at any time between the brushes of the second set switch and the second search switch is connected in the other of said second pair of balancing arms, bridge energizing means connected across one diagonal of the bridge, means connected across the remaining diagonal for comparing at any time the circuit under test with the corresponding reference circuit, and a pair of indicators, each indicator being connected in parallel with a respective one of said first pair of balancing arms and designed to indicate a defect in said first mentioned network at such time a discrepancy exists between said first mentioned network and said reference network.

3. Apparatus for testing a plurality of conductors of a multiple conductor network for opens and shorts, which comprises a reference network including a plurality of conductors corresponding to the conductors of the network under test and presenting a perfect network with which the network under test is to be compared, a pair of set switches, a pair of search switches, each of said switches being of a stepping type including a plurality of individual contacts, a movable brush and stepping means operative to move the brush into successive positions so that the individual contacts are engaged successively by the brush, a first of said set switches being designed so that its brush electrically engages in a predetermined sequence each of the end points of the conductors under test and a first of said search switches being designed so that its brush electrically engages successively each of the end points of said last mentioned conductors at each position of the brush of said first set switch, the second set switch operating concurrently with said first set switch so that its brush electrically engages successively in said predetermined sequence each of the end points of the reference conductors corresponding to the conductors under test and the second search switch operating concurrently with said first search switch so that its brush electrically engages successively each of the corresponding end points of the reference conductors at each position of the brush of said second set switch, means for energizing the stepping means of said switches, an electrical balancing bridge having a first pair of balancing arms of fixed impedance and a second pair of balancing arms, the brushes of said switches being connected electrically to the bridge in a manner such that the electrical circuit at any time between the brushes of the first set switch and the first search switch is connected in one of the second pair of balancing arms and the electrical circuit at any time between the brushes of the second set switch and the second search switch is connected in the other of said second pair of balancing arms, bridge energizing means connected across one diagonal of the bridge to energize the bridge for direct current testing, a fault detection relay connected across the remaining diagonal of said balancing bridge and responsive to a bridge unbalance to halt the testing operation by disconnecting said switch energizing means from said switch stepping means, and a pair of gas-filled discharge tubes, each tube being connected in parallel with a respective one of said first pair of balancing arms, one tube responsive to a bridge unbalance which occurs at such time a short exists between any conductors of the first mentioned network, the second tube responsive to a bridge unbalance which occurs at such time an open exists in any conductor of said first mentioned network.

4. Apparatus for comparing a plurality of conductors of a multiple conductor network with the conductors of a reference network for impedance within predetermined values, which comprises a reference network including a plurality of conductors corresponding to the conductors of the network under test and presenting a perfect network with which the network under test is to be compared, a pair of set switches, a pair of search switches, each of said switches being of the stepping type including a plurality of individual contacts, a movable brush and stepping means operable to move the brush into successive positions so that the individual contacts are engaged successively by the brush, a first of said set switches being designed so that its brush electrically engages in a predetermined sequence each of the end points of the conductors under test and a first of said search switches being designed so that its brush electrically engages successively each of the end points of said last mentioned conductors at each position of the brush of said first set switch, the second set switch operating concurrently with said first set switch so that its brush electrically engages successively in said predetermined sequence each of the end points of the reference conductors corresponding to the conductors under test and the second search switch operating concurrently with said first search switch so that its brush electrically engages successively each of the corresponding end points of the reference conductors at each position of the brush of said second set switch, means for energizing the stepping means of said switches, an electrical balancing bridge having a first pair of balancing arms of fixed impedance and a second pair of balancing arms, the brushes of the switches being connected electrically to the bridge in a manner such that the electrical circuit at any time between the brushes of the first set switch and the first search switch is connected in one of the second pair of balancing arms and the electrical circuit at any time between the brushes of the second set switch and the second search switch is connected in the other of said second pair of balancing arms, bridge energizing means connected across one diagonal of the bridge to energize the bridge for alternating current impedance testing, an amplifier connected across the remaining diagonal of said balancing bridge and responsive to a bridge unbalance which occurs at such time the difference in impedance between the first mentioned network and the reference network exceeds said predetermined values, a relay connected in the plate circuit of the amplifier, said relay being designed to disconnect said switch energizing means from said switch stepping means so as to halt the testing operation upon the occurrence of the impedance unbalance, and a pair of indicators, each indicator being connected across a respective one of said first pair of bridge balancing impedances and designed to indicate a fault in response to the bridge unbalance.

References Cited in the file of this patent

UNITED STATES PATENTS

| | | |
|---|---|---|
| 2,468,398 | Griffin | Apr. 26, 1949 |
| 2,584,680 | Doncyson | Feb. 5, 1952 |